United States Patent
Krill

(10) Patent No.: US 6,722,436 B2
(45) Date of Patent: Apr. 20, 2004

(54) APPARATUS AND METHOD FOR OPERATING AN INTERNAL COMBUSTION ENGINE TO REDUCE FREE OXYGEN CONTAINED WITHIN ENGINE EXHAUST GAS

(75) Inventor: Ross Michael Krill, Calgary (CA)

(73) Assignee: Precision Drilling Technology Services Group Inc. (CA)

( * ) Notice: Subject to any disclaimer, the term of this patent is extended or adjusted under 35 U.S.C. 154(b) by 80 days.

(21) Appl. No.: 10/054,849

(22) Filed: Jan. 25, 2002

(65) Prior Publication Data

US 2003/0141113 A1 Jul. 31, 2003

(51) Int. Cl.$^7$ .............................. E21B 21/16; C09K 7/08
(52) U.S. Cl. ...................... 166/303; 166/305.1; 175/69; 175/71; 507/102; 60/284; 123/689; 123/703
(58) Field of Search .............................. 166/305.1, 303, 166/268, 90.1, 401, 272.1; 507/102, 202, 904; 175/69, 70, 71; 60/284; 123/686, 689, 703

(56) References Cited

U.S. PATENT DOCUMENTS

| | | | | |
|---|---|---|---|---|
| 3,581,490 A | * | 6/1971 | Morris | 60/286 |
| 3,882,941 A | | 5/1975 | Pelofsky | |
| 3,943,709 A | * | 3/1976 | Holt | 60/274 |
| 4,136,747 A | * | 1/1979 | Mallory et al. | 175/66 |
| 4,183,405 A | * | 1/1980 | Magnie | 166/260 |
| 4,208,358 A | * | 6/1980 | Atkins et al. | 261/50.1 |
| 4,265,309 A | * | 5/1981 | Magnie | 166/252.2 |
| 4,283,256 A | * | 8/1981 | Howard et al. | 205/784.5 |
| 4,465,136 A | * | 8/1984 | Troutman | 166/402 |
| 4,469,075 A | * | 9/1984 | Jackson et al. | 123/523 |
| 4,570,603 A | * | 2/1986 | Piedrafita | 123/510 |
| RE32,301 E | * | 12/1986 | Latsch et al. | 123/406.44 |
| 5,170,727 A | * | 12/1992 | Nielsen | 110/346 |
| 5,273,344 A | * | 12/1993 | Volkwein et al. | 299/12 |
| 5,329,764 A | * | 7/1994 | Hamburg et al. | 60/285 |
| 5,553,580 A | * | 9/1996 | Ganoung | 123/308 |
| 5,663,121 A | * | 9/1997 | Moody | 507/102 |
| 5,954,040 A | * | 9/1999 | Riedel | 123/703 |
| 6,032,747 A | * | 3/2000 | Moody et al. | 175/71 |
| 6,443,229 B1 | * | 9/2002 | Kulka | 166/268 |
| 6,543,534 B2 | * | 4/2003 | Erick | 166/90.1 |
| 6,595,291 B1 | * | 7/2003 | Lia et al. | 166/305.1 |

FOREIGN PATENT DOCUMENTS

FR 2809757 12/2001

OTHER PUBLICATIONS

Stoeppelwerth, George. Exhaust gas provides alternative gas source for cyclic EOR. Apr. 26, 1993. Oil & Gas Journal, vol. 91, Issue 17. Start p.: 68.*

Derwent Publications, Ltd. document No. XP002237412, Jul. 9, 1995 (one sheet).

* cited by examiner

Primary Examiner—David Bagnell
Assistant Examiner—T Shane Bomar
(74) Attorney, Agent, or Firm—Merek, Blackmon & Voorhees, LLC

(57) ABSTRACT

A method and apparatus for controlling the operation of an internal combustion engine to reduce the presence of free oxygen in the exhaust gas of the engine. The method and apparatus provides for the internal combustion engine to be operated with a fuel-to-air ratio in excess of the stoichiometric ratio such that the exhaust gas from the internal combustion engine is devoid or substantially devoid of all free oxygen and excess unburned hydrocarbon fuel is expelled with the exhaust gas from the engine.

14 Claims, 1 Drawing Sheet

APPARATUS AND METHOD FOR OPERATING AN INTERNAL COMBUSTION ENGINE TO REDUCE FREE OXYGEN CONTAINED WITHIN ENGINE EXHAUST GAS

FIELD OF THE INVENTION

This invention relates to an apparatus and to a method for operating an internal combustion engine, and in particular an apparatus and method for operating and controlling an internal combustion engine so as to reduce or substantially eliminate free oxygen contained in the exhaust gas produced by the engine.

BACKGROUND OF THE INVENTION

A number of different industrial applications require the availability of a stream of gas that is either devoid of any free oxygen gas content, or that contains only minimal or trace amounts of oxygen gas. The elimination of free oxygen from a gas stream is often required in order to minimize corrosion and/or to minimize the potential for fire and explosion. For example, in the drilling of oil and gas wells, a stream of pressurized gas is often circulated from the surface down through the drill string to the drill bit to control sub-surface pressures, to carry cuttings and other debris from the bottom of the well bore to the surface, and in some instances to "power" a downhole motor used to drive a drill bit. To minimize the potential for fire, explosion, and the corrosion of metal components, such gases ideally have no free oxygen content. A stream of gas that is substantially devoid of free oxygen may also be required for underground reservoir pressure maintenance or for purging, pigging or testing piping and conduits.

Depending upon the particular industrial application, a variety of different sources of gas having no (or only trace amounts of) free oxygen may be utilized. For example, in the medical, food preparation, and microchip manufacturing industries where a highly pure and inert source of gas may be required, pressurized vessels containing nitrogen or other similar gas are often utilized. In other applications where the primary concern is that there be either no or only trace amounts of oxygen present in the gas, others have suggested the utilization of the exhaust gas stream from an internal combustion engine, particularly where remote locations or environmental issues are involved. Utilizing the exhaust gas stream from an internal combustion engine at a remote facility removes the necessity of transporting pressurized vessels of inert or oxygen-free gas over great distances, and also removes the associated cost. The use of the exhaust from an internal combustion engine as a source of such gas is particularly attractive in the drilling of oil and gas wells where the existence of combustion by-products is normally of little concern, or could even be beneficial.

Typically the intake air that is drawn into an internal combustion engine and utilized during the burning of hydrocarbon fuels will have a substantial portion of its free oxygen eliminated by means of the combustion process. Increasing the amount of fuel that is burned in the engine tends to increase the amount of free oxygen that is eliminated from the exhaust stream. Put another way, increasing the amount of fuel tends to decrease the amount of free oxygen that will be present in the engine's exhaust. As the amount of fuel is increased there will become a point at which the amount of fuel present within the engine's cylinders is sufficient such that all of the fuel reacts with all of the free oxygen present in the intake gas (the stoichiometric point) so that there will be complete combustion with the resulting exhaust gas stream substantially devoid of any free oxygen content. Unfortunately, to reach that point of complete combustion, the engine temperature that is achieved will typically far exceed the maximum operating temperature that standard internal combustion engine can safely handle. Further, at elevated operating temperatures internal combustion engines tend to create large amounts of nitrogen oxides and related compounds that are generally undesirable, and that may necessitate the implementation of additional processing steps downstream. For these reasons internal combustion exhaust gas systems that are currently available are generally designed to operate at a fuel-to-air mixture that allows the internal combustion engine to run below a level of complete combustion, and at or slightly below the engine's maximum operating temperature. Operating the internal combustion engine in this range will prevent damage to the engine through overheating, and will help to limit the production of nitrogen oxides while creating an exhaust gas stream having a reduced amount of free oxygen.

While it will be appreciated that while the amount of oxygen in the exhaust gas stream will be reduced, there will nevertheless still be an oxygen gas component within the engine's exhaust. Where small or trace amounts of free oxygen are unacceptable, the exhaust gas stream must be subjected to further processing to remove any remaining oxygen. Such further processing often involves "burning" any remaining oxygen within a catalytic converter or subjecting the exhaust gas to further chemical processing steps.

SUMMARY OF THE INVENTION

The invention therefore provides an apparatus and a method for operating an internal combustion engine that reduces the free oxygen content within the engine's exhaust, that permits the engine to be operated within its maximum recommended operating temperature, that reduces nitrogen oxides, and that may eliminate or reduce the need or extent to which the exhaust gas stream need be subjected to further downstream processing to remove any remaining free oxygen content.

Accordingly, in one of its aspects the invention provides a method of controlling the operation of an internal combustion engine to reduce the presence of free oxygen in the exhaust gas of the engine, the method comprising operating the internal combustion engine with a fuel-to-air ratio in excess of the stoichiometric ratio such that the exhaust gas from the internal combustion engine is devoid or substantially devoid of all free oxygen and excess unburned hydrocarbon fuel is expelled with the exhaust gas from the engine.

In a further aspect the invention provides an apparatus for controlling the performance and operation of an internal combustion engine to reduce the presence of free oxygen within the exhaust of the engine, the apparatus comprising a fuel-to-air ratio controller, said fuel-to-air ratio controller regulating the fuel-to-air mixture within the intake of the internal combustion engine such that the fuel-to-air ratio is maintained in excess of the stoichiometric ratio with the exhaust gas from the internal combustion engine devoid or substantially devoid of all free oxygen and excess unburned hydrocarbon fuel expelled with the exhaust gas from the engine.

In yet a further embodiment the invention provides a method for providing a stream of substantially oxygen free gas for use as a drilling fluid in the underground drilling of a wellbore, the method comprising the steps of, operating an internal combustion engine with a fuel-to-air ratio in excess of the stoichiometric ratio such that the exhaust gas from the internal combustion engine is devoid or substantially devoid of all free oxygen content; collecting the exhaust gas from the internal combustion engine and directing the exhaust gas to a compression stage where the exhaust gas is compressed to a desired pressure; and, directing said pressurized exhaust gas that is devoid or substantially devoid of any free oxygen content to the wellbore for use in the drilling process.

Further advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which.

DESCRIPTION OF THE PREFERRED EMBODIMENT

The present invention may be embodied in a number of different forms. However, the specification and drawings that follow describe and disclose only some of the specific forms of the invention and are not intended to limit the scope of the invention as defined in the claims that follow herein.

For a thorough understanding of the present invention it is useful to consider the combustion process that occurs within an internal combustion engine that utilizes a hydrocarbon fuel. To that end, reference is made to FIG. 1 which shows a graph generally depicting the relationship between the amount of fuel that is introduced into an internal combustion engine and the operating temperature of the engine in response thereto. Movement to the right along the horizontal (or "X") axis of the graph represents an increase in the fuel-to-air ratio, or in other words an increase in the amount of fuel introduced into the engine. Moving upwardly along the vertical (or "Y") axis represents an increase in engine operating temperature. The plotted curve on the graph shows the general effect that increasing the fuel-to-air ratio has on engine operating temperature. The horizontal line, labelled MT, represents the maximum temperature at which the engine may be safely operated. Beyond that temperature failure of mechanical parts, or the chemical breakdown or combustion of lubricating oils, may occur.

Figure 1:
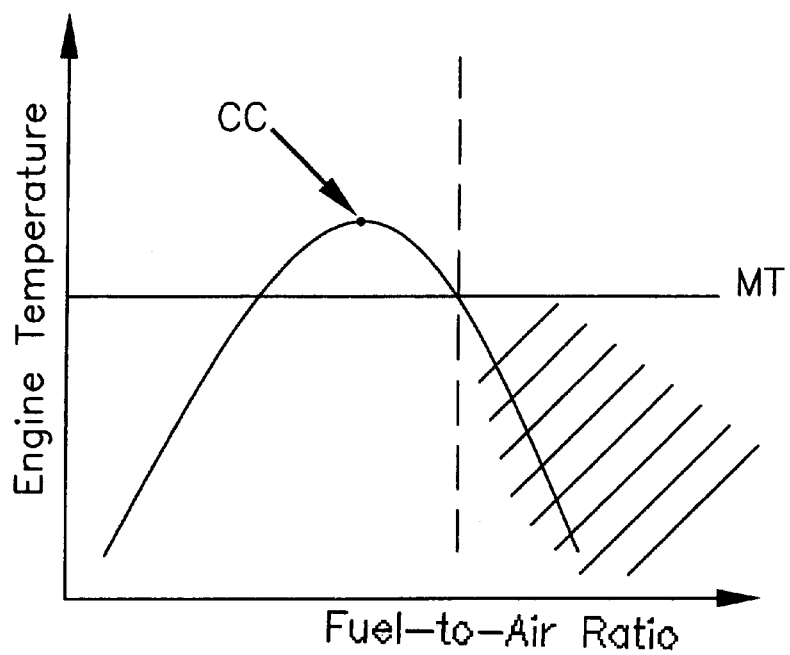
FIG. 1 is a graph showing the general relationship between the amount of fuel introduced into an internal combustion engine and the operating temperature of the engine in response thereto; and, FIG. 2 is a pictorial view of an internal combustion engine depicting an embodiment of the present invention.

It will be appreciated that depending upon particular engine configuration and design, the cooling system employed, the environmental conditions under which the engine is operating, the type of fuel being consumed, and a variety of other factors and conditions, the operating temperature for an internal combustion engines may vary, as may the engine's maximum operating temperature. The net effect of such factors and operating conditions is to shift the curve in FIG. 1 (and possibly the line MT) upwardly or downwardly along the "Y" axis. Regardless of the absolute temperatures involved, for the vast majority of internal combustion engines, and under most operating conditions, as the fuel-to-air ratio increases the engine will reach its maximum operating temperature long before it is able to achieve a condition of complete combustion. In this context combustion is considered to be complete at the point where the amount of fuel introduced into the engine is sufficient to react with all oxygen gas within the combustion air. In FIG. 1 the point of complete combustion (or the stoichiometric fuel-to-air ratio) is located at the apex of the curve and is labelled "CC". At that point the combustion by-products will, for all intents and purposes, be comprised of carbon dioxide, water and nitrogen gas, with no traceable amounts of oxygen gas. However, the existence of impurities within the fuel, in the combustion air, or within the engine itself, may result in trace amounts of other gases and/or compounds also being present within the exhaust stream.

It will also be appreciated that the stoichiometric fuel-to-air ratio for a particular engine may change under different operating conditions. For example, changes in ambient air temperature, altitude affects on air composition, varying fuel composition, the presence of volatiles within the fuel, and a variety of other factors can effect the stoichiometric fuel-to-air ratio, and effectively shift the curve in FIG. 1 to the left or to the right. While such factors (as well as others, some of which have been discussed above) can shift or alter the curve shown in FIG. 1 in the "X" and/or the "Y" directions, the overall relationship between the engine's fuel-to-air ratio and operating temperature will generally be represented by a curve similar to that as plotted.

During operation, a hydrocarbon fuel burning internal combustion engine will typically form one of three different general groups of exhaust by-products, depending upon the relative location along the curve in FIG. 1 at which the engine is operating. These three groups of by-products can be classified as "lean" fuel-to-air ratio combustion by-products, stoichiometric ratio combustion by-products, and "rich" fuel-to-air ratio combustion by-products.

To demonstrate the nature of each of these three groups of combustion by-products, the exhaust from an internal combustion engine that burns propane will be considered. Under such circumstances, the general chemistry of the combustion that occurs is as follows:

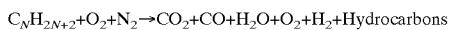

$$C_NH_{2N+2}+O_2+N_2 \rightarrow CO_2+CO+H_2O+O_2+H_2+\text{Hydrocarbons}$$

Where there is a "lean" fuel-to-air ratio mixture there will be an excessive amount of air beyond that required for combustion of the propane fuel, and oxygen gas will be present in the engine exhaust. There will also generally be no (or only small amounts) of CO or $H_2$ produced. Under this scenario the engine will be operating on the left-hand side of the curve shown in FIG. 1. When operating under a stoichiometric condition (point CC in FIG. 1) the by-products of the combustion process will be essentially $CO_2$, $H_2O$ and $N_2$. When the internal combustion engine is operated under a "rich" fuel-to-air ratio mixture (ie along the right-hand side of the curve in FIG. 1), there will be more fuel injected into the engine than required for complete combustion of the free oxygen resulting in the production of $H_2$, and generally the production of substantially elevated levels of CO above and beyond those encountered when operating under lean or stoichiometric conditions. $CO_2$, $H_2O$ and $N_2$ will also be produced to varying degrees. Essentially all of the free oxygen gas will be consumed and the exhaust gas will have no appreciable free oxygen content. Operating the engine "rich" will also result in excess unburned hydrocarbon fuel being expelled with the exhaust gas stream.

With reference again to FIG. 1, the plotted curve shows that as the amount of fuel within an internal combustion engine increases, engine and exhaust temperatures increase until the point of complete combustion is reached, after which increasing the fuel-to-air ratio further has a temperature decreasing effect. FIG. 1 also indicates that for a typical internal combustion engine, at the point of complete combustion the temperature of the engine will far exceed the maximum temperature that the engine can safely handle. For that reason currently existing internal combustion engines are designed to operate under a somewhat "lean" fuel-to-air ratio such that they fall within the left-hand side of the curve, at a point below the engine's maximum operating temperature (ie below line MT). Doing so ensures that the engine is not overheated and damaged, and also prevents the expulsion of unburned hydrocarbon fuels with the engine's exhaust. The presence of unburned hydrocarbon fuels within an exhaust gas stream is typically considered to be environmentally damaging and an inefficient use of energy resources.

In contrast, under the method of the present invention the internal combustion engine is intentionally operated with a fuel-to-air ratio in excess of the stoichiometric ratio, causing unburned hydrocarbon fuel to be expelled with the exhaust gas stream. Operating the engine under such conditions ensures that the fuel-to-air ratio of the engine falls along the right-hand side of the curve in FIG. 1. In the preferred embodiment of the invention the fuel-to-air ratio is also sufficiently high to ensure that the engine operates at a point that is below its maximum recommended operating temperature (ie below line MT in FIG. 1). This preferred operating range is represented generally by the shaded portion on the right-hand side of the curve of FIG. 1. Operating the internal combustion engine within this "target zone" will result in unburned hydrocarbon fuel being present within the exhaust gas, will ensure that no appreciable amount of free oxygen gas is expelled from the engine, will ensure that the temperature of the engine remains below its maximum operating temperature, and will also reduce the production of acidic byproducts.

Figure 2:
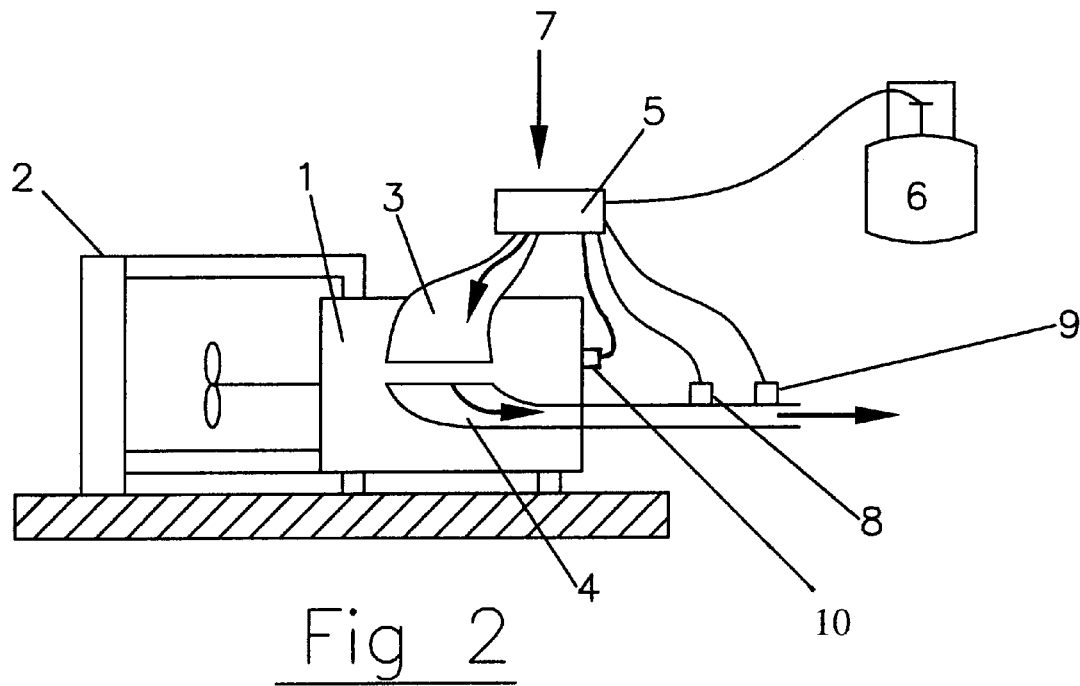

The present invention also provides for an apparatus for controlling the performance and operation of an internal combustion engine according to the above described method so as to reduce the presence of free oxygen gas within the engine's exhaust. With reference to FIG. 2, there is shown an internal combustion engine having a cooling system 2, an intake manifold 3, and an exhaust manifold 4. The apparatus for controlling the performance of the engine according to the invention is shown generally by reference numeral 5. Apparatus 5 would typically be connected to intake manifold 3 and generally comprises a fuel-to-air ratio controller that regulates the fuel-to-air mixture within the internal combustion engine in order to maintain the ratio in excess of the stoichiometric ratio. Fuel-to-air ratio controller 5 will be connected to a source of fuel 6 and a source of combustion air 7. Controller 5 preferably includes volumetric fuel and air controls that are adjustable so as to maintain the fuel-to-air ratio within intake manifold 3 at a level in excess of the stoichiometric ratio, and preferably at a point allowing the engine to operate below its maximum allowable temperature. In an alternate embodiment, the fuel-to-air ratio controller may be integrated into a fuel injection system rather than being connected directly to the engine's intake manifold. Regardless of the precise configuration of the fuel-to-air ratio controller, through maintaining the fuel-to-air ratio in excess of the stoichiometric ratio, apparatus 5 will ensure the virtual elimination of essentially all free oxygen from the engine's exhaust and will also result in unburned hydrocarbon fuel being expelled with the exhaust gas.

A further embodiment the method of the present invention includes the step of monitoring the free oxygen content in the exhaust gas stream from the internal combustion engine and increasing the fuel-to-air ratio within the engine's intake in response to the detection of oxygen gas within the exhaust stream. It will, however, be appreciated from an understanding of FIG. 1 that while the fuel-to-air ratio may be adjusted so that there is no measurable amount of free oxygen in the exhaust gas stream, the ratio could still be at a level where the engine is caused to operate above its maximum recommended operating temperature. Therefore, adjustments to the fuel-to-air ratio based upon the detection of free oxygen within the exhaust gas should also preferably involve the monitoring of engine temperature so that a "rich" enough fuel-to-air ratio can be utilized to ensure the virtual elimination of free oxygen from the exhaust gas while maintaining operating temperatures below maximum levels (ie pushing the operating conditions to the right along the X axis in FIG. 1 to a point beyond "MT").

Alternately, or in addition to monitoring for free oxygen, the exhaust gas may be monitored for the presence of carbon-monoxide. As a result of inefficiencies in the combustion process, under lean or stoichiometric operating conditions small or trace amounts of CO will often be present in the exhaust gas stream. However, where an engine is operating beyond the point of complete combustion (ie beyond the stoichiometric point) significantly higher levels of carbon monoxide will be produced and expelled with the other exhaust gases. The presence of elevated levels of carbon monoxide in the exhaust is generally indicative of an engine that is operating with a fuel-to-air ratio in excess of the stoichiometric ratio and to the right of point CC in FIG. 1. Accordingly, under the present invention in the event that substantial or elevated levels of carbon monoxide are not detected with the exhaust gases, the fuel-to-air ratio may be increased to the point where significant levels of carbon monoxide are found to be present. At that point the engine will be operating at a position to the right of point CC in FIG. 1 and there will be essentially no free oxygen with its exhaust. For the same reasons as discussed above with respect to the monitoring of free oxygen in the exhaust gas, engine temperature is also preferably monitored to ensure that the fuel-to-air mixture is sufficiently "rich" to keep operating temperatures below maximum recommended values.

It will, of course, be appreciated that the actual amount or percentage of CO within an exhaust gas stream may vary from engine to engine and under different operating conditions. In general, the type and composition of the hydrocarbon fuel being burned and the construction of the particular engine can affect the amount of carbon dioxide that is produced under both lean and rich conditions. In the context of the present invention, elevated levels of carbon monoxide are those that are well in excess of levels that are commonly encountered in a lean running engine or an engine operating at its stoichiometric fuel-to-air ratio.

To monitor the free oxygen content within the exhaust gas stream, in one embodiment the invention includes an oxygen sensor 8 positioned within exhaust manifold 4 (or at some other convenient location within the engine's exhaust). Oxygen sensor 8 may be operatively connected to fuel-to-air ratio controller 5 such that if free oxygen is detected within the exhaust gas stream, controller 5 increases the fuel-to-air ratio of the engine's intake through adjustment of one or both of its volumetric fuel and air controls. As discussed, to ensure that the engine does not operate at a point beyond its maximum recommended temperature, in the preferred embodiment an engine temperature sensor 10 is also operatively connected to fuel-to-air ratio controller 5. Controller 5 is then able to utilize signals received from both oxygen sensor 8 and temperature sensor 10 to maintain the fuel-to-air ratio at a sufficiently "rich" level such that no free oxygen is detected within the exhaust gas stream and the engine operates at below its maximum recommended temperature.

Similarly, there may also be positioned within exhaust manifold 4 (or at some other convenient place within the exhaust stream) a carbon monoxide sensor 9. As in the case of oxygen sensor 8, carbon monoxide sensor 9 may be operatively connected to fuel-to-air controller 5 allowing the controller to increase the fuel-to-air ratio of the engine's intake until it reaches a position where a predetermined minimum level of carbon monoxide is detected within the exhaust gas stream. In a similar fashion to that as described above, controller 5 will also preferably adjust the fuel-to-air ratio in response to signals received from temperature sensor 10 such that the engine is operated in the "target zone" as depicted in FIG. 1, with no appreciable free oxygen in its exhaust gas stream and with its temperature below the maximum recommended value.

It will be appreciated by those skilled in the art that in one embodiment of the invention fuel-to-air ratio controller 5 may include a microprocessor to receive electronic signals from oxygen sensor 8, and/or temperature sensor 10, and/or carbon monoxide sensor 9. In this embodiment the volumetric fuel and air controls are preferably pneumatically, hydraulically and/or electrically operated and are also connected to the microprocessor. In response to changes in readings received from the various sensors, the internal programming of the microprocessor will cause it to adjust one or both of the volumetric fuel and air controls to maintain the fuel-to-air ratio within a predetermined desired range. In an alternate embodiment, oxygen sensor 8, temperature sensor 10 and carbon monoxide sensor 9 may be connected to digital or analogue displays that enable an operator to manually adjust one or both of the volumetric fuel and air controls as required.

From an appreciation of the present invention it will be understood that the inventive method and apparatus allows for the control and operation of an internal combustion engine that reduces (or essentially eliminates) any free oxygen contained within the engine exhaust gas stream. This result is accomplished at the expense and through the utilization of an excessive amount of fuel, and with a resulting expulsion of unburned hydrocarbon fuel into the engine's exhaust. However, in applications such as the drilling of oil and gas wells or for reservoir pressure maintenance the presence of hydrocarbons within the exhaust gas stream is of little consequence.

Accordingly, in one aspect the invention presents a method and apparatus that produces a stream of gas substantially devoid of any free oxygen content that is particularly suited for oil and gas drilling, for reservoir pressure maintenance, or for various other uses within the oil and gas or petrochemical industries. When used in the drilling of oil and gas wells the exhaust gas stream may be subsequently directed to acid reduction and/or pressurization systems as is common in the industry. In some cases the exhaust gas stream may also be exposed to one or more catalysts to help reduce nitrogen oxides, carbon monoxide and any trace amounts of oxygen that may be present or that may find their way into the gas stream.

It is to be understood that what has been described are the preferred embodiments of the invention and that it may be possible to make variations to these embodiments while staying within the broad scope of the invention. Some of these variations have been discussed while others will be readily apparent to those skilled in the art.

I claim:

1. A method of controlling the operation of an internal combustion engine to reduce the presence of free oxygen in the exhaust gas of the engine, the method comprising operating the internal combustion engine with a fuel-to-air ratio in excess of the stoichiometric ratio such that the exhaust gas from the internal combustion engine is devoid or substantially devoid of all free oxygen and excess unburned hydrocarbon fuel is expelled with the exhaust gas from the engine, the method including monitoring engine temperature and, while maintaining the fuel-to-air ratio in excess of the stoichiometric ratio, adjusting the fuel-to-air ratio of the intake of the internal combustion engine to maintain the engine temperature below a predetermined value.

2. The method as claimed in claim 1 including the further step of monitoring the free oxygen content of the exhaust gas from the internal combustion engine and increasing the fuel-to-air ratio of the intake of the internal combustion engine in response to the detection of free oxygen within the exhaust gas.

3. The method as claimed in claim 1 including monitoring the exhaust gas from the internal combustion engine for the presence of elevated levels of carbon monoxide, in the event that an elevated level of carbon monoxide is not detected within the exhaust gas stream adjusting the fuel-to-air ratio of the intake of the internal combustion engine until an elevated level of carbon monoxide is detected within the exhaust gas stream.

4. The method as claimed in claim 3 including monitoring engine temperature and further adjusting the fuel-to-air ratio of the intake of the internal combustion engine to maintain the engine temperature below a predetermined value.

5. The method as claimed in claim 1 wherein the internal combustion engine is operated utilizing a gaseous hydrocarbon fuel.

6. The method as claimed in claim 5 wherein said gaseous hydrocarbon fuel is propane or natural gas.

7. An apparatus for controlling the performance and operation of an internal combustion engine to reduce the presence of free oxygen within the exhaust of the engine, the apparatus comprising a fuel-to-air ratio controller, said fuel-to-air ratio controller regulating the fuel-to-air mixture within the intake of the internal combustion engine such that the fuel-to-air ratio is maintained in excess of the stoichiometric ratio with the exhaust gas from the internal combustion engine devoid or substantially devoid of all free oxygen and excess unburned hydrocarbon fuel expelled with the exhaust gas from the engine, the apparatus including an engine temperature sensor, said temperature sensor operatively connected to said fuel-to-air ratio controller and causing said controller to adjust the fuel-to-air ratio of the intake of the internal combustion engine to maintain the engine temperature below a predetermined value.

8. The apparatus as claimed in claim 7 wherein said fuel-to-air ratio controller includes volumetric fuel and air controls, said volumetric fuel and air controls adjustable to maintain the fuel-to-air ratio of the intake of the internal combustion engine at a level in excess of the stoichiometric ratio under the operating conditions of the internal combustion engine.

9. The apparatus as claimed in claim 8 including an oxygen sensor, said oxygen sensor positioned within the exhaust stream of the internal combustion engine and operatively connected to said fuel-to-air ratio controller, upon said oxygen sensor detecting free oxygen gas within the engine's exhaust said oxygen sensor causing said fuel-to-air ratio controller to increase the fuel-to-air ratio of the intake of the internal combustion engine through adjustment of one or both of said volumetric fuel and air controls.

10. The apparatus as claimed in claim 8 including a carbon monoxide sensor, said carbon monoxide sensor positioned within the exhaust stream of the internal combustion engine and operatively connected to said fuel-to-air ratio controller, said carbon monoxide sensor causing said fuel-to-air ratio controller to adjust the fuel-to-air ratio of the intake of the internal combustion engine until said carbon monoxide sensor detects an elevated level of carbon monoxide within the exhaust stream of the internal combustion engine.

11. A method for providing a stream of substantially oxygen free gas for use as a drilling fluid, the method comprising the steps of:

(i) operating an internal combustion engine with a fuel-to-air ratio in excess of the stoichiometric ratio such that the exhaust gas from the internal combustion engine is devoid or substantially devoid of all free oxygen content;

(ii) monitoring engine temperature and adjusting the fuel-to-air ratio of the intake of the internal combustion engine to maintain the engine temperature below a predetermined value;

(iii) collecting the exhaust gas from the internal combustion engine and directing the exhaust gas to a compression stage where the exhaust gas is compressed to a desired pressure; and (iv) directing said pressurized exhaust gas that is devoid or substantially devoid of any free oxygen to a drilling operation for use as a drilling fluid.

12. The method as claimed in claim 11 including the further step of monitoring the free oxygen content of the exhaust gas from the internal combustion engine and increasing the fuel-to-air ratio of the intake of the internal combustion engine in response to the detection of free oxygen within the exhaust gas.

13. The method as claimed in claim 11 including monitoring the exhaust gas from the internal combustion engine for the presence of elevated levels of carbon monoxide, in the event that an elevated level of carbon monoxide is not detected within the exhaust gas stream increasing the fuel-to-air ratio of the intake of the internal combustion engine until an elevated level of carbon monoxide is detected within the exhaust gas stream.

14. The method as claimed in claim 11 including the further step of subjecting said engine exhaust to a de-acidification processes prior to delivery of said exhaust to the wellbore.

* * * * *